United States Patent [19]
Tomioka et al.

[11] Patent Number: 5,092,518
[45] Date of Patent: Mar. 3, 1992

[54] HOT-AIR TYPE HEATER

[75] Inventors: Mituharu Tomioka, Kashihara; Tadashi Yamazaki, Nara; Hiroo Oshima, Nara; Hajime Satoda, Nara; Mitsuhiro Imajima, Yamatokoriyama, all of Japan

[73] Assignee: Matsushita Electric Industrial Co., Ltd., Osaka, Japan

[21] Appl. No.: 349,812

[22] Filed: May 10, 1989

[30] Foreign Application Priority Data

May 16, 1988 [JP] Japan .................................. 63-118537

[51] Int. Cl.⁵ .............................................. F24D 5/00
[52] U.S. Cl. ................................. 236/10; 126/110 A; 392/367; 237/50; 237/53
[58] Field of Search .................... 237/70, 50, 53; 236/49.1, 13, 12.1, 10; 432/65, 222; 126/110 B, 110 C, 110 D, 110 A; 392/347, 351, 360, 365, 367, 368

[56] References Cited

FOREIGN PATENT DOCUMENTS

| 88549 | 5/1983 | Japan | 236/49.1 |
| 0208466 | 9/1986 | Japan | 126/110 A |

Primary Examiner—Henry A. Bennet
Attorney, Agent, or Firm—Stevens, Davis, Miller & Mosher

[57] ABSTRACT

Provided is a hot-air type heater including a heat generating means such as a burner heater from which hot air is produced and blown out the heater into a living room so as to warm up the inside of the room with a uniform temperature distribution even among various heating rate conditions. The hot-air heater includes at least of variable angle louvers which are vertically swingable, and a control means for swinging the louver in association with at least either a hot air flow rate at a hot air outlet opening of the heater or the heating value of the heat generating means, so that the louver is vertically swung in accordance with an output from the control means in order to minimize differences in temperature distribution in the room during operation of the heater under various heating conditions.

25 Claims, 10 Drawing Sheets

HOT-AIR TYPE HEATER

BACKGROUND OF THE INVENTION

The present invention relates to a hot-air type room heater which changes a cold air flow generated by a fan into a hot air flow by using heat generating means such as a burner.

Figure 11:
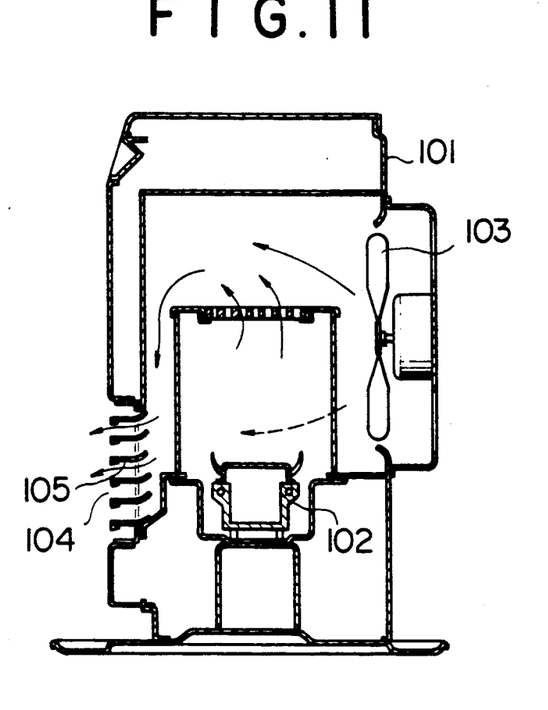
FIG. 11 is a sectional view illustrating a hot-air heater of prior art.
Figure 12:
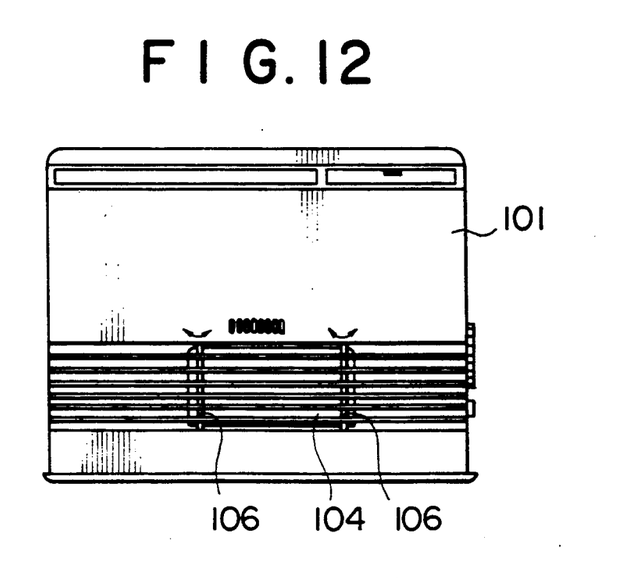
FIG. 12 is a front view illustrating the hot-air heater shown in FIG. 11.

Generally in a hot-air type heater of the above-mentioned type, as shown in FIG. 11, a burner 102 or heat generating means is provided in a heater body 101, and heated gas from the burner is mixed with a cold air from a fan 103 arranged on the rear side of the heater body and blown out through a hot air outlet 104 for heating a room inside. The outlet 104 is provided with several horizontal louvers 105 for leading the air in a substantially horizontal direction. However, since the louvers are fixed to the heater body and can not change the air flow-out direction, a problem arises in that the temperature distribution in the room is widely varied in dependence on heating conditions, i.e. high capacity heating, moderate capacity heating and low capacity heating. In detail, in the case of high capacity heating, the air flow from the fan 103 is strong and the hot air is distributed uniformly over almost the entire accommodation space of a living room only excluding corner regions thereof, while in the case of moderate or low capacity heating, the air flow from the fan 103 becomes rather weak, and the upward draft flow of the hot air becomes relatively strong, causing a shorter horizontal reach of the hot air and a local high temperature in the vicinity of the heater and deteriorating the comfortableness of the room. This problem has not been solved by such movable vertical louvers as shown in FIG. 12, which can be changed in their directions left and right. Namely, although these vertical louvers can change the horizontal diverging angle of the hot air flow and somewhat improve the temperature distribution in the horizontal direction, the problem relating to temperature distribution difference among high, moderate and low capacity heating conditions has not been solved, because the extent of reach of hot air can not be changed by the vertical louvers.

SUMMARY OF THE INVENTION

The object of the present invention is to solve the above-mentioned problem of the prior art, and to provide hot-air type heating which ensures a minimum variation of temperature distribution among high, moderate and low capacity heating conditions for producing comfortable heating.

To achieve this object, according to the present invention, there is provided at a hot air outlet with angle-variable louvers which are swingable vertically about horizontal axes, and further provided with control means for controlling the flow rate of hot air and/or the calorific power of the heat generating means and the swinging motion of the louver.

In the above-mentioned arrangement of the present invention, the louvers are inclined in dependence on a heating rate, thereby changing the out-flow direction of the hot air. In consequence, the extent of reach of hot air in the room can be maintained substantially constant regardless of heating rates, and a substantially uniform temperature distribution can be obtained for various conditions of heating power.

DESCRIPTION OF THE PREFERRED EMBODIMENTS

Hereinafter, an embodiment of the present invention will be described by referring to FIGS. 1 to 8 of the accompanying drawings.

Figure 1:
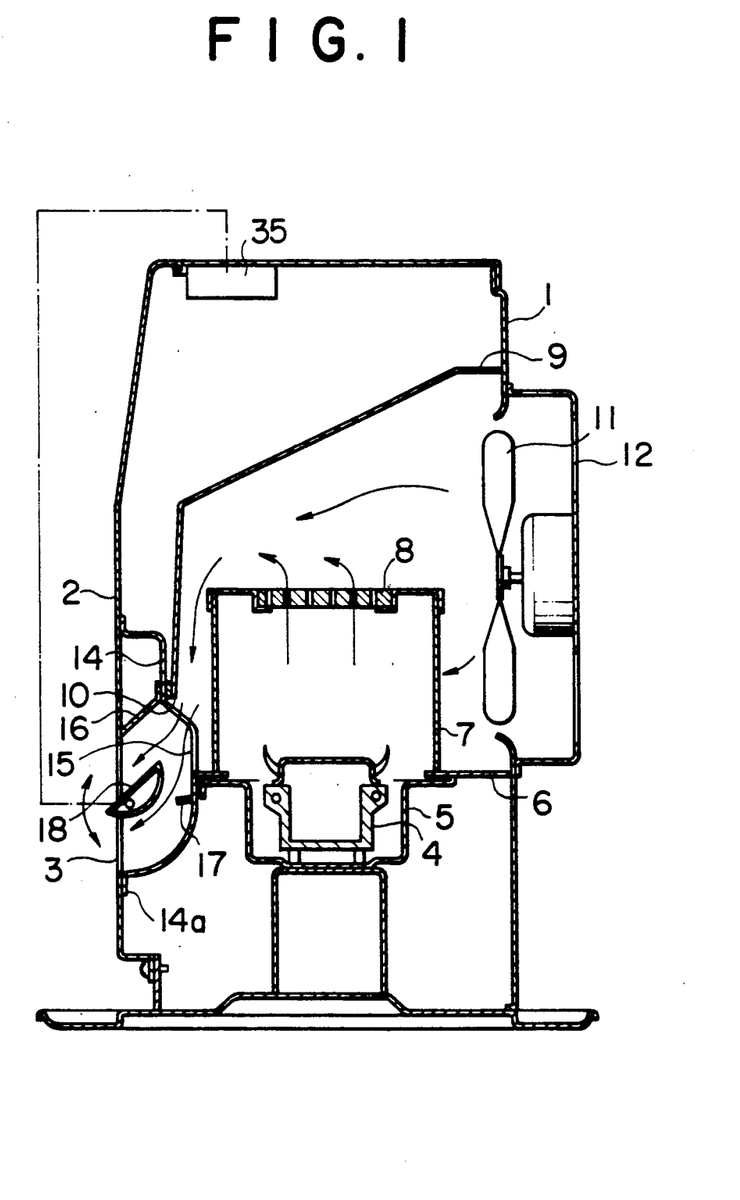
FIG. 1 is a sectional view illustrating a hot-air type heater according to an embodiment of the present invention.

The hot-air type heater includes a heater body 1, a front panel 2 having a hot air outlet 3. In the heater body 1, there is provided a vaporizing burner 4 constituting heat generating means which vaporizes kerosine and burns the same. A burner case 5 surrounds the lower portion of the burner 4, and fixed to a partition plate 6. A burning tube 7 surrounding the upper portion of the burner 4 is planted on the partition plate 6, and is provided with an exhaust gas purifying catalyzer 8 of a honeycomb type at the upper opening of the tube. A duct 9 is arranged in the heater body 1, for covering the burning tube 7, and is formed with an opening 10 at a front lower portion thereof. A convection fan 11 is located confronting the rear portion of the duct, and is covered by a fan guard 12. The convection fan 11 sucks the air in the room from outside of the heater and supplies the air to the duct 9 in which the sucked air is mixed with the heated gas from the burning tube 7 and is then blown out through the hot air outlet 3.

A flow-out frame 14 is arranged in the lower opening 10 of the duct 9, and is screwed to fittings 13 (in FIG. 2) mounted on both side plates 1a of the heater body 1 at both sides of the frame. The frame 14 has a concave cross-sectional shape including an opening 15 in its bottom plate which is located to meet with the opening 10 of the duct 9, and the edge portions 14a of the frame make contact with the inner surface of the front panels 2, thereby communicating the opening 10 of the duct 9 with the hot air outlet 3. The flow-out frame 14 is formed thereon with a downwardly inclined guide fin 16 at the upper edge of the opening 15 and with a substantially horizontal guide fin 17 at the lower edge of the same.

An angle-variable louver 18 is attached to the frame 14 in the upper portion of the hot air outlet 3. The louver has a sufficient width so as to cover the substantially upper half portion at the frame 14 and also has a rear surface 18a of a circular shape. The angle-variable louver 18 has shafts 19 projecting from the lower portions of both end parts of the louver and piercing through a support member 13 secured to the side plates 1a of the heater body, and is therefor rotatable in a direction indicated by the arrow d in FIG. 2 by the support member 13 through the shaft 19. A cam 20 is fixed to each of the shafts 19 and has two pins 21a and 21b. Driving means 23 is for swinging louver 18 and composed of a first driving plate 24 and a second driving plate 25, which are superposed one upon another allowing relative sliding motion therebetween and connected together through the intermediary of a spring 26 so that the driving plates 25, 26 move together as one united body in a usual case. The first driving plate 24 is formed therein with two slits 24a and 24b, the former slit 24a engages with the pin 21a of the cam 20. The second driving plate 25 is formed therein with a cut-out 28 and a step 29 which serves as a coupling for driving motor 31 as will be described later. A guide means 30 is provided for guiding the vertical motion of the driving plates 24 and 25 moving together.

Figure 2:
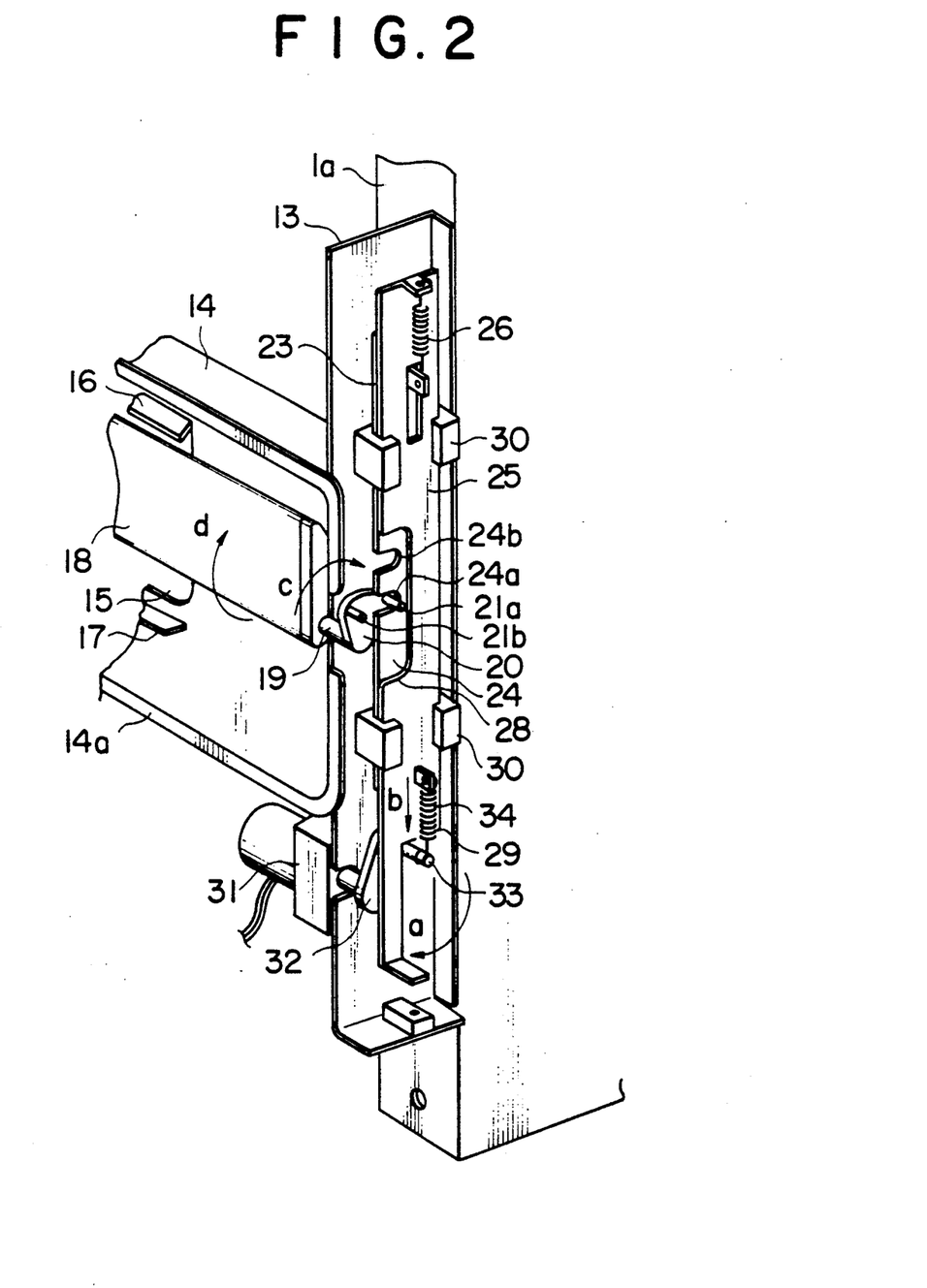
FIG. 2 is an enlarged perspective view illustrating an essential part of the heater shown in FIG. 1.

The driving motor 31 is provided for driving the first and second driving plates 24 and 25, and is a reversible stepping motor. On the shaft of the driving motor is mounted a driving cam 32 having a driving pin 33 which engages with the step 29 of the second driving plate 25. A spring 34 is for urging the second driving plate 25 against the pin 33 on the cam 32.

Figure 6:
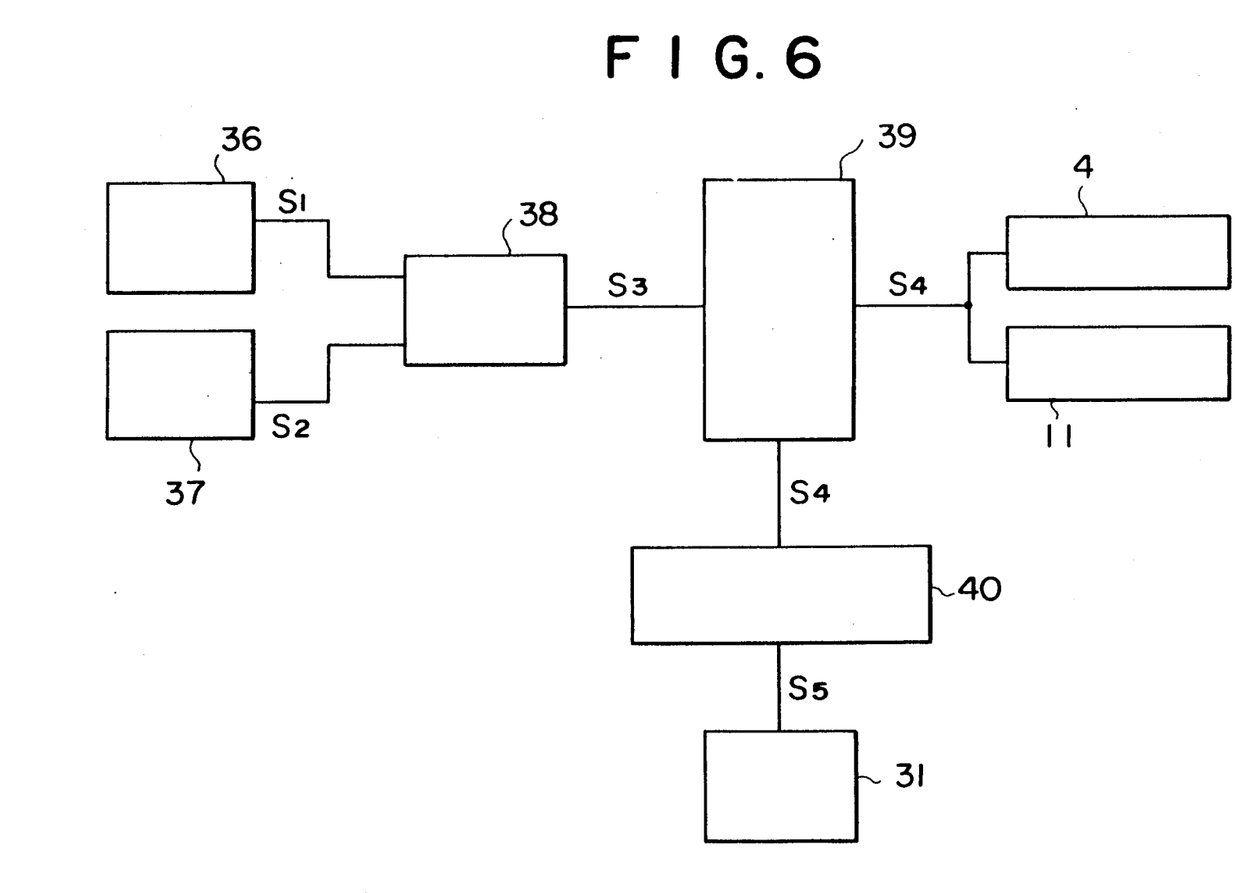
FIG. 6 is a view illustrating a block diagram of control means.

The block diagram of control means 35 for controlling driving motor 31 is shown in FIG. 6. The control means includes a temperature detector 36 such as a thermistor, a room temperature setting means 37, a comparator 38 which receives a signal $S_1$ from the temperature detector 36 and a signal $S_2$ from the room temperature setting means 37 and compares these signals with each other, and which then produces an output signal $S_3$ indicating a high, moderate or low heating rate in response to the result of the comparison, and a burner control means 39 for controlling the burning rate of the burner 4 and the air flow rate of the convection fan 11 in accordance with the output signal $S_3$ from the comparator 38. A control signal $S_4$ from the burner control means 39 is also transmitted to the louver driving means 40 which calculates a control signal $S_5$ in accordance with the signal $S_4$ for controlling the swinging angle of the louver 18 and delivers it to the motor 31.

Figure 7:
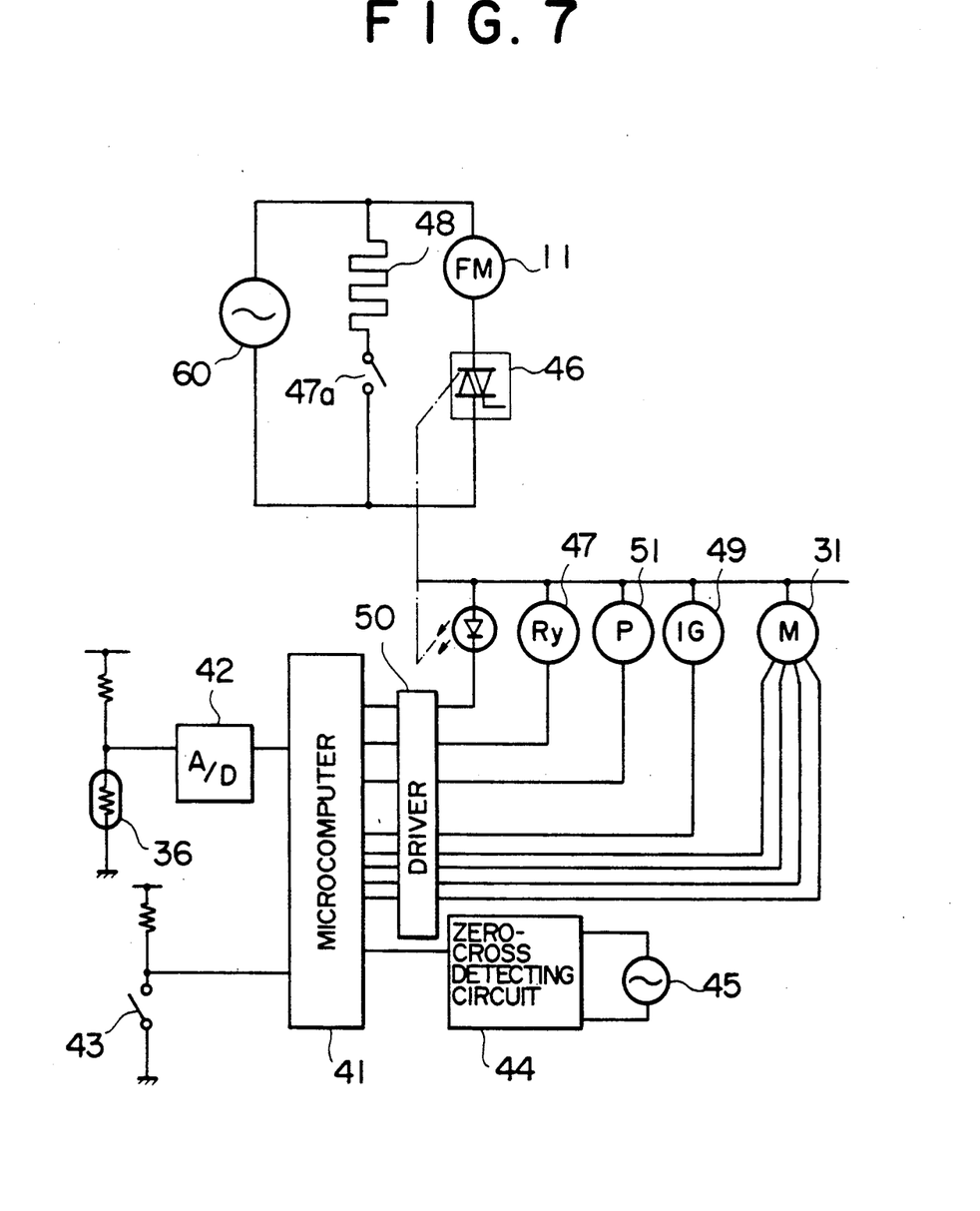
FIG. 7 is a view illustrating a detailed circuit of the control means.

FIG. 7 shows an example of an essential portion of a circuit in a specific form. The control means 35 is composed of a microcomputer 41 and related circuits. This microcomputer 41 includes a CPU, ROM, RAM and input and peripheral units that is, it is a so-called one tip microcomputer.

The temperature detector 36 is connected to the microcomputer 41 through an A/D converter 42, and the temperature signal from detector 36 is therefore transformed into a binary coded signal, and is delivered to the microcomputer 41. An operation switch 43 is for commanding a start of burning, and delivers a starting signal to the microcomputer 41. There is provided a zero-cross detecting circuit 44 which generates pulse signals each having 1 ms pulse width when the circuit detects zero-cross points of an alternating current source synchronized with the electric power source, and informs the microcomputer of these zero-cross points through these pulse signals. A semiconductor switch 46 is composed of a light emitting portion (LED) and a light receiving portion (TRIAC). A relay 47 turns on or off a heater 48 for vaporizing fuel to be burnt. Numeral 49 denotes an igniter. A driver 50 amplifying signals from the microcomputer 41 is connected through its output terminals with the semiconductor switch 46, the relay 47, an electromagnetic pump 51, the igniter 49, and the motor 31, and drives these loads through the amplified signals.

Figure 8:
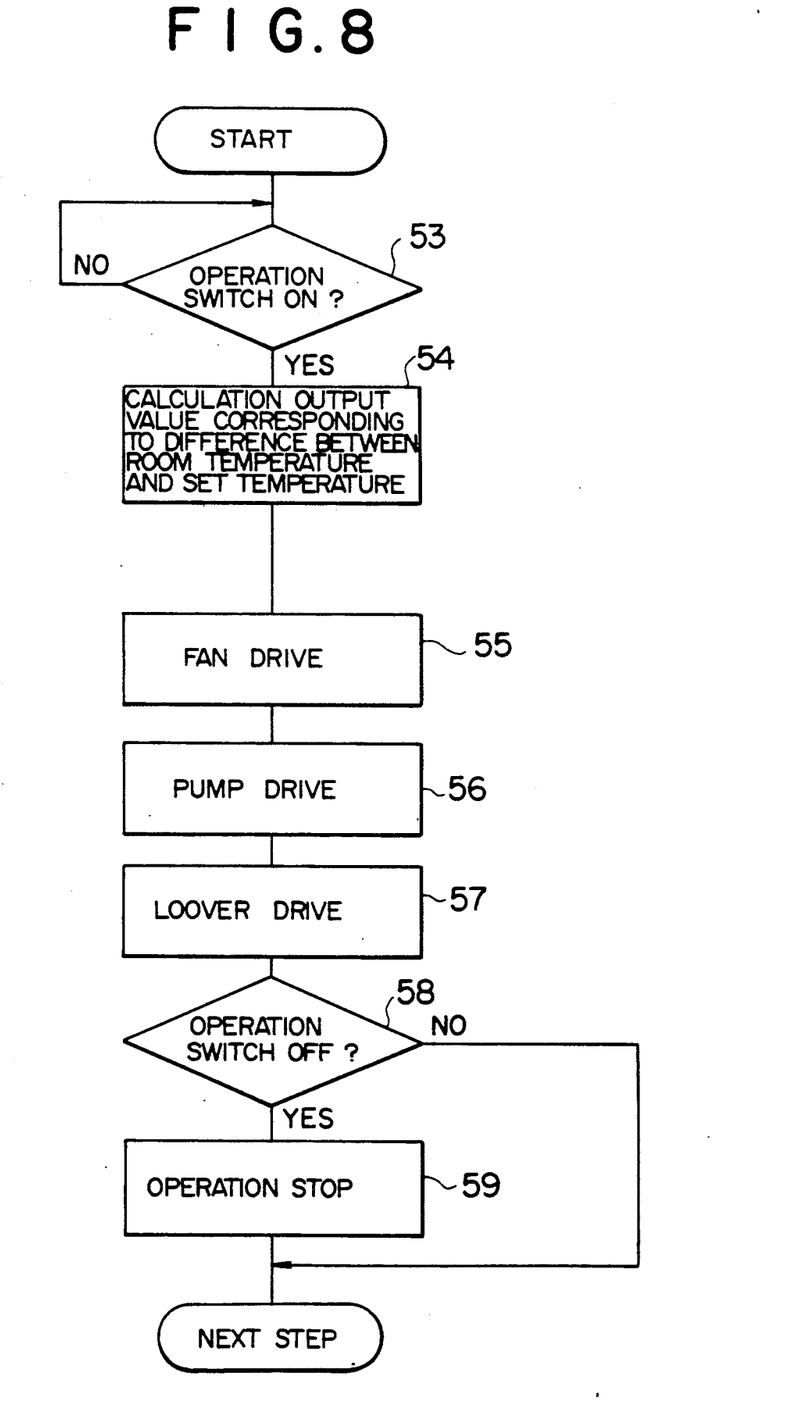
FIG. 8 is a view illustrating a flowchart for the control means.

FIG. 8 shows a flowchart explaining a process carried out by the microcomputer 41.

At step 53 the state of the operation switch 43 is determined. The process is advanced to the next step 54 if the switch 43 is turned on, but is returned to the step 53 if the switch is turned off. At step 54 a burning rate is calculated in accordance with the difference between a room temperature detected by the temperature detector 36 and a set temperature. Based on the calculated burning rate, through steps 55, 56, 57 a fan revolution speed, a pump frequency, and an angle of the angle-variable louver 18 are obtained in order to drive loads. Namely, suitable values for the fan revolution speed, the pump frequency and the angle of the louver corresponding to various burning rates have already been determined and accordingly can be obtained by use of arithmetic functions or from a table, and these items are suitably selected when the burning rate is changed.

Step 58 is a branch to determine whether the switch 43 is turned on or off. If it is turned on, the process jumps over step 59 to the next step but if it is turned off, the process goes to step 59 at which the burning is stopped and the louver comes to its stop position, and then the process goes to the next step.

Further, in FIG. 7, an A.C. current source 60 is connected in parallel with a heater 48 through a contact 47a of the relay 47, and with the fan 11 through a semiconductor switch 46. The revolution speed of the fan 11 can be adjusted by means of phase control.

The function of the above-mentioned heater will be described hereinafter.

Figure 3:
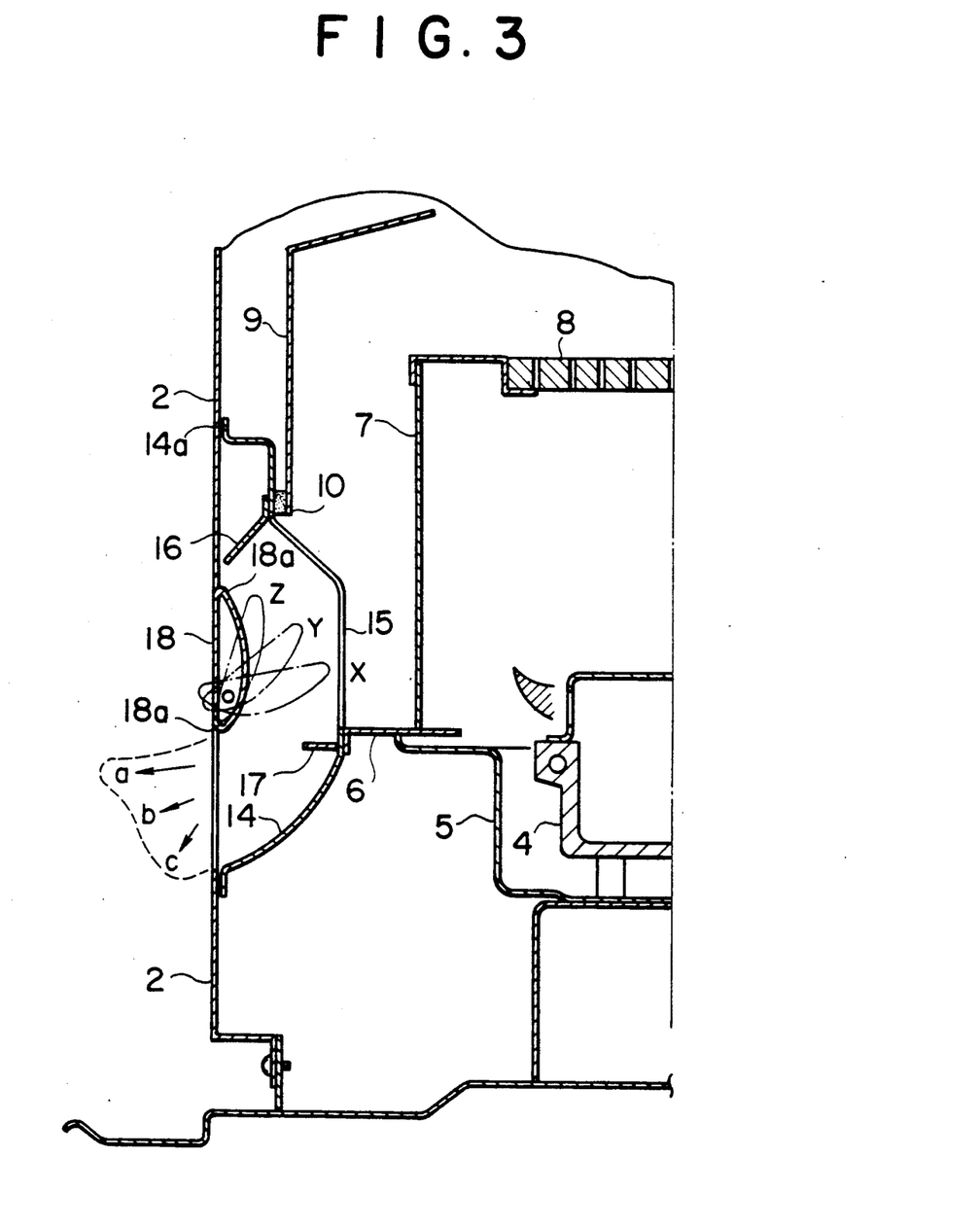
FIG. 3 is an enlarged sectional view illustrating the essential part of the heater shown in FIG. 1.
Figure 5:
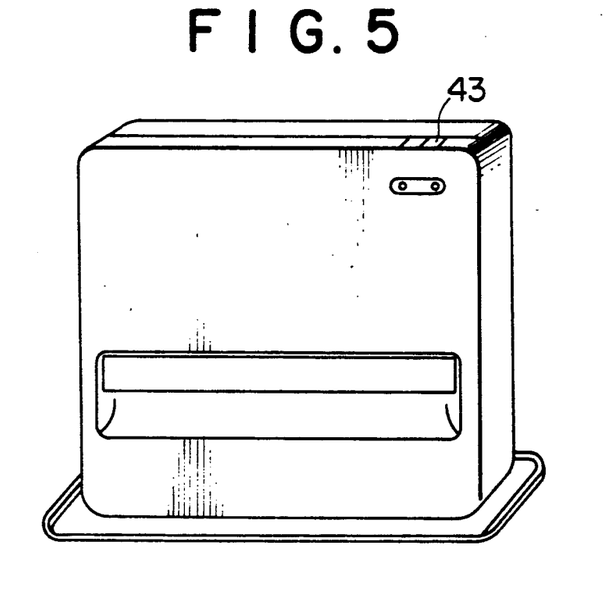
FIG. 5 is a perspective view illustrating the heater.

Before starting of heater operation, the angle-variable louver 18 is situated, as shown in FIGS. 3 and 5, in a substantially vertical direction (this position is denoted as a stop position hereinafter) so as to substantially cover the upper half area of the hot air outlet opening 3.

When the operation switch 43 is turned on, the relay 47 closes and the heater 48 is energized for preheating. When the preheating is completed, the relay 47 is opened while the igniter 49 is turned on and the control means transmits a predetermined pulse signal to the electromagnetic pump 51, thereby starting the ignition for burning, the rotation of the fan and the swing motion of the louver from the stop position to a predetermined position.

In detail, the burning control means 39 is actuated in response to the output signal $S_3$ from the comparator 38, which is generated in accordance with output signals from the temperature detector 36 and the room temperature detector 37, and delivers the control signal $S_4$ for starting the burning and rotation of the fan 11 along with a predetermined sequence. At the same time, the control signal $S_4$ is also inputted to the louver driving means 40 for driving the motor 31 so as to rotate the louver 18 by a predetermined angle.

As shown in FIG. 2, when the motor 31 rotates, the drive shaft 33 of the drive cam 32 rotates in a direction indicated with the arrow a, and the second driving plate 25 under the tension of the spring 34 and the first driving plate 24 connected to the second driving plate 25 through the spring 26 are moved downward as indicated with the arrow b. Accordingly, the cam 20 is rotated through the pin 21a which engages in the slit 24a of the driving plate 24, thereby rotating the angle-variable louver 18 as indicated by the arrow d by means of the cam 20 and the shaft 19.

Figure 4:
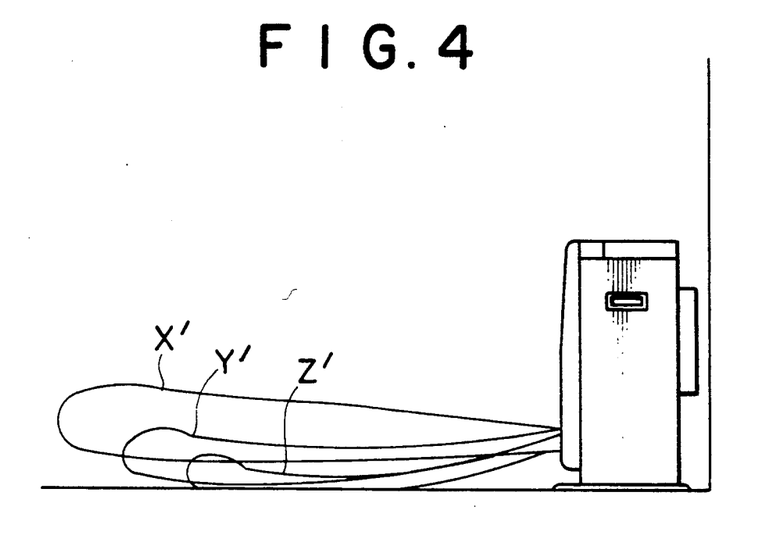
FIG. 4 is a view explaining the function of the heater.

The rotation angle of the louver 18 varies according to the signal $S_4$ from the burning control means 39, the positions of louver being shown in FIG. 3 as X, Y and Z corresponding to high, moderate and low heating rates, respectively. The angular motion of the louver is associated with the burning rate and the fan air flow rate. As shown in FIG. 3, in the case of a high burning rate or a high fan air flow rate, the louver 18 is substantially set to be horizontal as shown at the position X, while in the case of a moderate burning rate and a moderate fan air flow rate, the louver is inclined slightly downwards. In consequence, the hot air flow in the room in this moderate capacity case is directed slightly downwards in comparison with that in the high capacity case as shown at the position Y' in FIG. 4, and the hot air therefore reaches a farther point in comparison with that as in the case of conventional heater. Similarly, in the case of low capacity burning and low speed fan running, the direction of the hot air flow is inclined further downward, and the hot air flows along the floor as shown in FIG. 4 at the position Z'. In consequence, even if the hot air flow has a low speed and is apt to be influenced by upward draft action by hot air, the extent of horizontal reach of the hot air become considerably long. Thus, a substantially uniform temperature distribution can be obtained among the high, moderate and low capacity cases.

The hot air coming through the duct 9 is guided by the arcuate inner surface 18a of the louver 18. By virtue of the Coanda effect given by the arcuate inner surface 18a, the direction of hot air flow is diverged into directions, indicated by the vectors a, b and c in FIG. 3. That is the upmost air flow along the arrow a has a speed and a capacity higher than those along the arrows b and c, and gives a relatively horizontal flow resulting in a great extent of horizontal reach of hot air flow. This result is greatly enhanced by the Coanda effect so as to have a large total amount (hot air capacity) of the vectors with a small energy low. Accordingly, the hot air flow as a whole is not substantially affected by upflow draft due to the upmost hot air flow a having a higher speed and a higher capacity and thereby giving a great extent of reach of the hot air and a greatly enhanced comfortable space. The Coanda effect is enhanced by arranging the guide fin 17 in the outlet 3 at a position opposite to the lower portion of the louver 18. Since the Coanda effect is more significant in low capacity heating with a low speed air flow than in high capacity heating with high speed air flow, the hot air flows substantially horizontally for all cases so as to ensure a favorable temperature distribution in the room.

When the louver 18 is substantially vertical, the hot air from the outlet 3 does not make direct contact with the floor, but is deflected by the guide fin 7, causing the air flow to come into contact with the floor at a position slightly remote from the outlet 3. Before making contact with the floor, the hot air is mixed with the air in the room and cooled to some degree, thereby preventing the floor from becoming too hot.

Since the louver 18 is rotatably supported at lower positions thereof, the lower end 18a of the louver 18 does not significantly protrude from the front surface of the heater body 1 even at any one of the louver positions as shown by X, Y, Z in FIG. 3, and accordingly an uncomfortable external appearance is avoided. On the other hand, the upper portion of the louver 18 considerably projects into the air flow passage behind the outlet 3, thereby efficiently deflecting the hot air flow coming through the duct 9.

Further, it may happen that the louver in a horizontal position assumed during high capacity heating with a large air flow rate is accidentally moved to a vertical position by, for example, a mischievous boy. In such a case, the second driving plate 23 is raised upwards by the louver 18 through the pin 21a. However, the upward motion of the plate 23 is absorbed by an extension of springs 26 and 34 which link the first and second drive plates 23, 25 with each other, and the driving cam 32 and the motor 31 receive no great force other than the spring force, which is not so great as to break the motor. When the external force with which the louver 18 is displaced to its vertical position is removed, the springs 26 and 34 shrink again, causing the second driving plate 23 to move downwards and the louver 18 to move its original horizontal position by means of the cam 20 and the pin 21a. In this way, the motor is protected from an external force acting on the louver, and the hot air outlet is protected from being closed for a long time during high capacity heating.

In addition, since the louver is rotated by the motor in association with springs, the vibration of the motor is absorbed by the springs, thereby reducing an uncomfortable noise generated at the shaft of the louver, and providing quiet operation to the heater.

When the heating operation is stopped, the burning control means 39 outputs no signal, and accordingly, the louver driving section 40 rotates the motor 31 in a direction opposite to that of the arrow a in FIG. 2 so as to return the louver 18 to the original position. The reverse motion of the motor raises the first and second driving plates 24, 25 upwards, rotates the cam 20 in a direction opposite to that of the arrow c, and returns the louver 18 to its vertical position where the upper half of the outlet opening 3 is closed, thereby a plain external appearance of the heater is presented.

Figure 9:
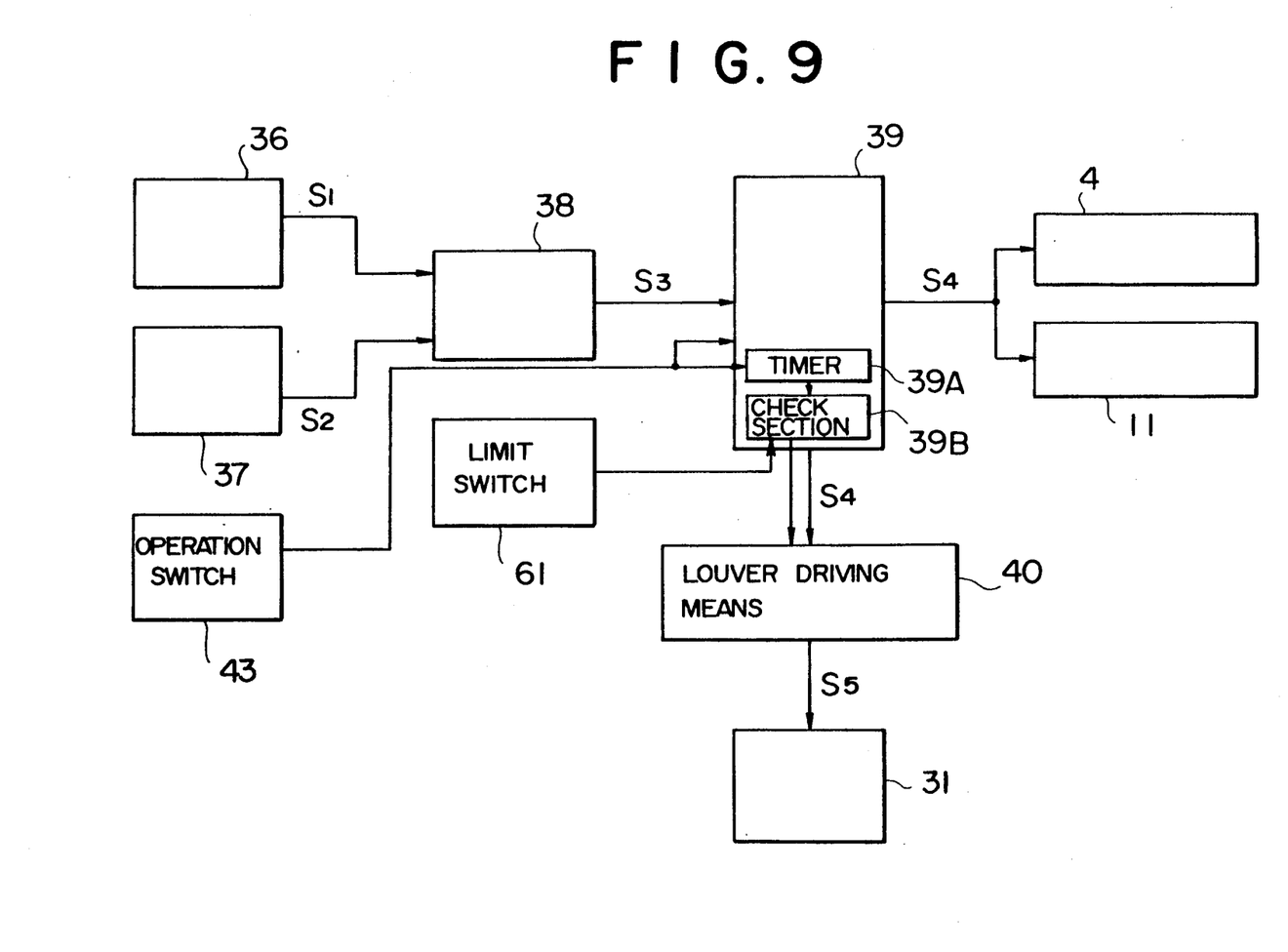
FIG. 9 is a view illustrating a block diagram of control means according to another embodiment of the present invention.

FIG. 9 shows a block diagram of a control means according to another embodiment of the present invention. This embodiment includes a timer 39A which starts time counting when the operation switch 43 is turned on, a limit switch 61 which detects rotation of the motor 31, and a check section 39B which is included in the burning control means 39 and judges that the operation is abnormal if no signal is inputted from the limit switch 61 before the time counting comes to an end. The function of the burning control means 39 will be described below with reference to the flowchart shown in FIG. 10. When the operation switch 43 is turned on, the microcomputer in the burning control means 39 starts its processing operation while the timer 39A starts time counting, and the burner control means outputs a signal to the louver driving means 40 for driving the louver. Then the microcomputer judges whether the above-mentioned time-counting ends or not. If a signal indicating that the limit switch is turned on, is issued within the period of the time counting by the timer 39A, a start of normal operation of the louver 18 from its original position is confirmed, the timer 39A is restarted for continuously driving the louver. Further the microcomputer judges again whether the above-mentioned time-counting ends or not. If a signal indicating that the time switch is turned off is issued within the period of the restarted time counting, it is confirmed that the louver is normally rotated and then returned to its original position. After that, the afore-mentioned usual operation is carried out.

Figure 10:
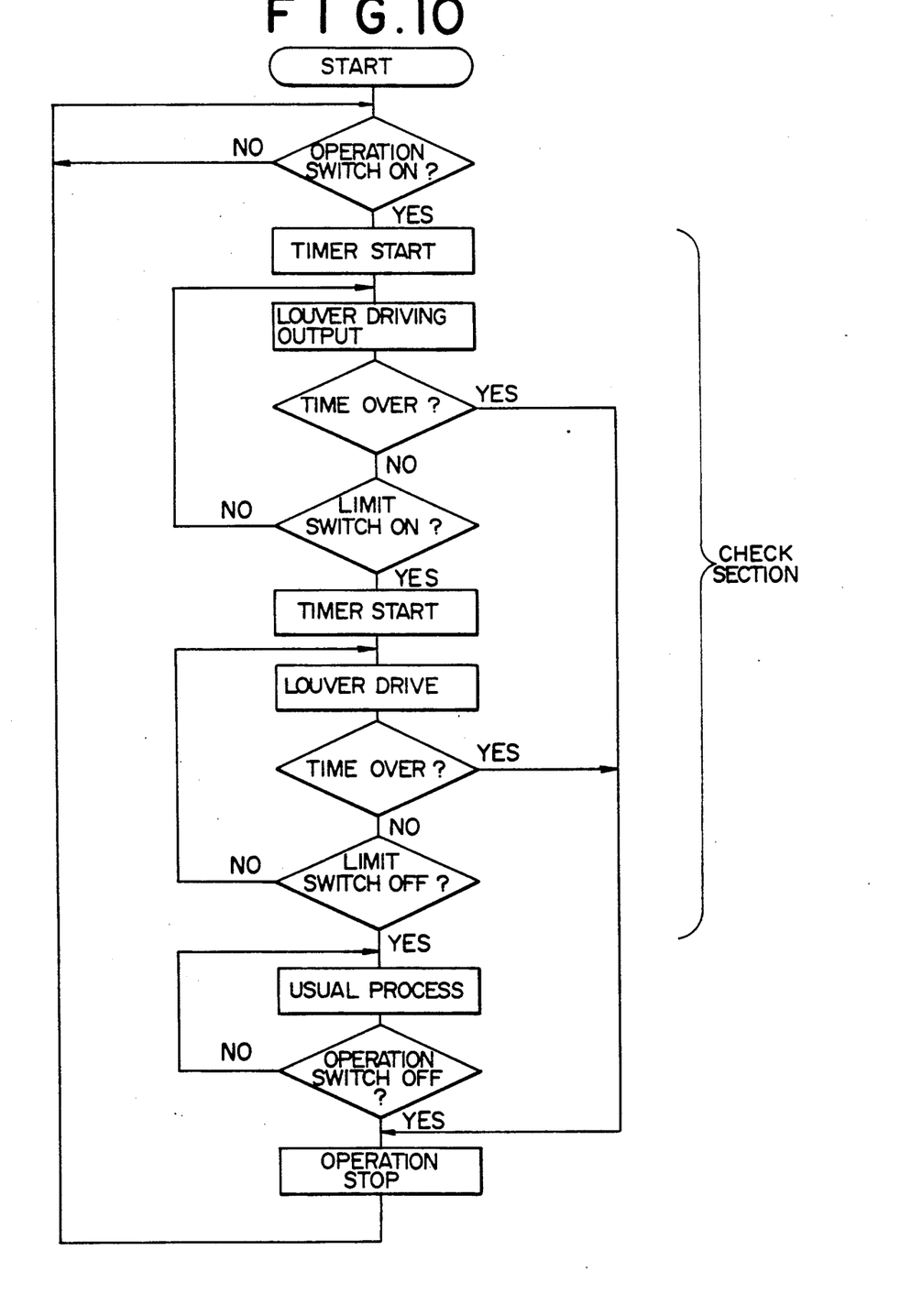
FIG. 10 is a view illustrating a flowchart for the control means shown in FIG. 9.

That is, the microcomputer sets a burning rate in accordance with signals from the temperature detecting means 36 and the room temperature setting means 37, and initiates the combustion. Further the computer transmits a louver driving output signal to the lower drive means 40 to rotate the louver 18 by a predetermined rotating angle. When the above-mentioned signal indicating that the limit switch is turned on or off is not issued within the period of the time counting, it is decided that the rotation of the louver is abnormally stopped due to a certain defect, and the operation of the heater is then stopped.

By virtue of this arrangement, in case that the louver is accidentally jammed or the motor fails to rotate due to some reason, since the louver 18 does not work even though the motor 31 is driven, the limit switch 61 is not actuated and accordingly an abnormal condition is detected thereby assuring the safety operation of the heater.

Although in the above embodiments, the control of the louver 18 is linked to both of the controls for burning rate and fan air flow rate, it may be linked to only one of them. The louver is not limited to a single louver, but may be plural. While the preferred embodiments have been described in order to explain the invention in specific forms, various changes and variations may be made without departing from the spirit or scope of the present invention.

As mentioned above, the hot air heater according to the present invention allows a uniform air temperature distribution in a room for various heating rate conditions by rotating the louver about a horizontal axis in accordance with the burning rate and the hot air flow rate.

Further, since the louver can take a substantially vertical posture and cover the upper half portion of the hot air outlet opening when the heater is out of operation, a plain external appearance of the heater can be obtained.

What is claimed is:

1. A hot-air type heater, comprising:
    a heater body having a hot air outlet opening;
    heat generating means disposed in said heater body;
    a convection fan for supplying air flow to said heat generating means and for blowing out hot air through said hot air outlet opening;
    angle-variable louver means disposed in said hot air outlet opening and supported to swing about an axis oriented substantially normal to an air outflow direction from said hot air outlet opening, for controlling deflection in a vertical direction of said hot air from said convection fan; and
    control means for changing a variable parameter of said heater responsive to heating demands, said variable parameter being one of (i) a hot air flow rate at said hot air outlet opening and (ii) a heating value of said heat generating means, and for swinging said angle-variable louver means about said axis in accordance with a variation in said variable parameter;
    whereby said angle-variable louver means is oriented in a vertical direction upon resting of said heater so as to close said hot air outlet opening and is swung about said axis to a predetermined position which is determined in accordance with said variable parameter so as to control deflection to said hot air in a vertical direction in accordance with one of said flow rate and said heating valve.

2. A hot air type heater as set forth in claim 1, wherein said angle-variable louver means has an arcuate inner surface.

3. A hot air type heater as set forth in claim 1, wherein said heater further comprises a duct surrounding said heat generating means having front and rear openings, and a flow-out frame disposed between said hot air outlet opening and said front opening of said duct and, said angle-variable louver means being disposed in said flow-out frame so as to be rotatably in a vertical direction.

4. A hot air type heater as set forth in claim 3, wherein a substantially horizontal fin is arranged at a position facing the lower portion of said hot air outlet opening of said flow-out frame.

5. A hot air type heater as set forth in claim 1, wherein said angle-variable louver means is rotatably supported at lower end positions thereof.

6. A hot air type heater as set forth in claim 1, wherein said angle variable louver means is arranged in the upper section of said hot air outlet opening and comprises a wide plate member covering at least one half of the area of said hot air outlet opening.

7. A hot-air type heater comprising:
    a heater body having a hot air outlet opening;
    heat generating means disposed in said heater body;
    a duct surrounding said heat generating means and having front and rear openings;
    a convection fan for supplying air flow around said heat generating means and for blowing out hot air through said hot air outlet opening;
    a flow-out frame disposed between said hot air outlet opening and said front opening of said duct;
    angle-variable louver means disposed in said flow-out frame so as to be supported swingably about an axis oriented substantially normal to an airflow direction from said hot air outlet opening to control deflection in a vertical direction of said hot air; and
    control means for changing a variable parameter of said heater responsive to heating demands, said variable parameter being one of a hot air flow rate at said hot air outlet opening and a heating value of said heat generating means, and for swinging said angle-variable louver means about said axis in accordance with a variation in said variable parameter;
    wherein said angle-louver means is oriented in a vertical direction upon resting of said heater so as to close said hot air outlet opening and is swung about said axis to a predetermined position which is determined in accordance with said variable parameter so as to deflect said hot air in a vertical direction.

8. A hot air type heater as set forth in claim 7, wherein said angle-variable louver means has an arcuate inner surface.

9. A hot air type heater as set forth in claim 7, wherein said angle-variable louver means is disposed in said flow-out frame so as to be rotatable in a vertical direction.

10. A hot air type heater as set forth in claim 9, wherein a substantially horizontal fin is arranged at a position facing the lower portion of said hot air outlet opening of said flow-out frame.

11. A hot air type heater as set forth in claim 7, wherein a substantially horizontal fin is arranged at a position facing the lower portion of said hot air outlet opening of said flow-out frame.

12. A hot air type heater as set forth in claim 7, wherein said angle-variable louver means is rotatably supported at lower end positions thereof.

13. A hot air type heater as set forth in claim 7, wherein said angle-variable louver means is arranged in the upper section of said hot air outlet opening and comprises a wide plate member covering at least one half of the area of said hot air outlet opening.

14. A hot-air type heater, comprising:
a heater body having a hot air outlet opening;
heat generating means disposed in said heater body;
a convection fan for supplying air flow to said heat generating means and for blowing out hot air through said hot air outlet opening;
angle-variable louver means disposed in said hot air outlet opening, for blowing out hot air through said hot air outlet opening and for deflecting said hot air in a vertical direction;
a reversible motor linked to said louver means through the intermediary of a resilient means; and
control means for changing a variable parameter of said heater responsive to heating demands, said variable parameter being one of a hot air flow rate at said hot air outlet opening and a heating value of said heat generating means, and for vertically swinging said angle-variable louver means in accordance with a variation in said variable parameter;
wherein said angle-variable louver means is oriented in a vertical direction upon resting of said heater so as to close said outlet opening and is swung about an axis oriented substantially normal to and air outflow direction from said hot air outlet opening to a predetermined position which is determined in accordance with said variable parameter.

15. A hot air type heater as set forth in claim 14, wherein said angle-variable louver means has an arcuate inner surface.

16. A hot air type heater as set forth in claim 14, wherein said heater further comprises a duct surrounding said heater generating means and having front and rear openings, and a flow-out frame disposed between said hot air outlet opening and said front opening of said duct, said angle-variable louver means being disposed in said flow-out frame so as to be rotatable in a vertical direction.

17. A hot air type heater as set forth in claim 16, wherein a substantially horizontal fin is arranged at a position facing the lower portion of said hot air outlet opening of said flow-out frame.

18. A hot air type heater as set forth in claim 14, wherein said angle-variable louver means is rotatably supported at lower end positions thereof.

19. A hot air type heater as set forth in claim 14, wherein said angle-variable louver means is arranged in the upper section of said hot air outlet opening and comprises a wide plate member covering at least one half of the area of said hot air outlet opening.

20. A hot-air type heater, comprising:
a heater body having a hot air outlet opening;
heat generating means disposed in said heater body;
a convection fan for supplying air flow to said heat generating means and for blowing out hot air through said hot air outlet opening;
angle-variable louver means disposed in said hot air outlet opening, for blowing out hot air through said hot air outlet opening and for deflecting the hot air in a vertical direction;
a reversible motor linked to said louver means through the intermediary of a resilient means;
control means for changing a variable parameter of said heater responsive to heating demands, said variable parameter being one of a hot air flow rate at said hot air outlet opening and a heating value of said heat generating means, and for controlling vertical swinging said angle-variable louver means in accordance with a variation in said variable parameter;
a drive means, responsive to said control means, for vertically rotating said louver means in accordance with an instruction from said control means; and
a check means for checking the rotation of said louver means and for stopping the drive of said louver means by said drive means if the rotation of said louver means is not confirmed;
wherein said angle-louver means is rotatably supported so as to be positioned in a vertical direction upon resting of said heater so as to close said hot air outlet opening, and is swung about an axis oriented substantially normal to an air outflow direction from said hot air outlet opening to a predetermined position which is determined in accordance with said variable parameter so as to vertically deflect the hot air.

21. A hot air type heater as set forth in claim 20, wherein said angle-variable louver means has an arcuate inner surface.

22. A hot air type heater as set forth in claim 20, wherein said heater further comprises a duct surrounding said heater generating means and having front and rear openings, and a flow-out frame disposed between said hot air outlet opening and said front opening of said duct, said angle-variable louver means being disposed in said flow-out frame so as to be rotatable in a vertical direction.

23. A hot air type heater as set forth in claim 21, wherein a substantially horizontal fin is arranged at a position facing the lower portion of said hot air outlet opening of said flow-out frame.

24. A hot air type heater as set forth in claim 21, wherein said angle-variable louver means is rotatably supported at lower end positions thereof.

25. A hot air type heater as set forth in claim 21, wherein said angle-variable louver means is arranged in the upper section of said hot air outlet opening and comprises a wide plate member covering at least one half of the area of said hot air outlet opening.

* * * * *